Figure 1:
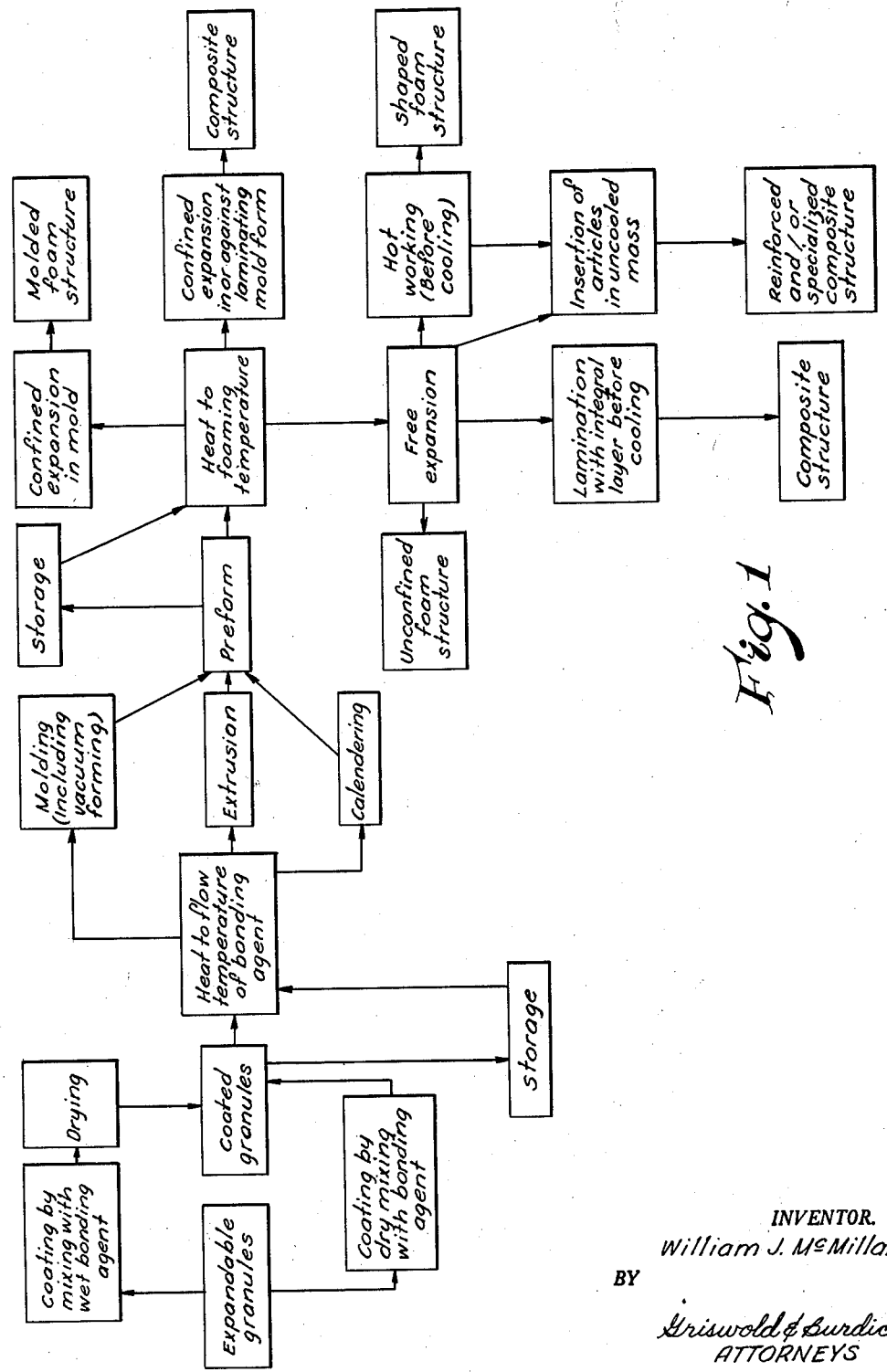

INVENTOR.
William J. McMillan
BY
Griswold & Burdick
ATTORNEYS

Oct. 27, 1964   W. J. McMILLAN   3,154,604
METHOD FOR FORMING ARTICLES COMPRISING EXPANDED
THERMOPLASTIC RESINOUS MATERIALS
Filed March 19, 1956   2 Sheets-Sheet 2
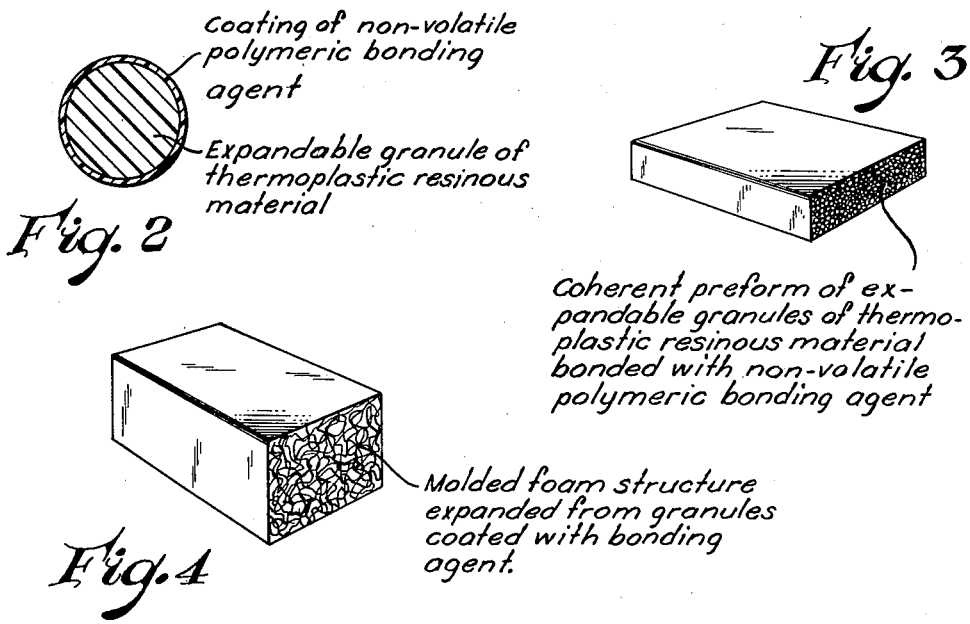
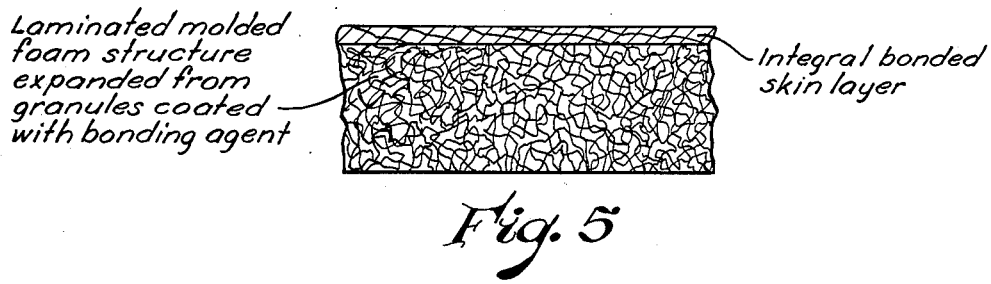
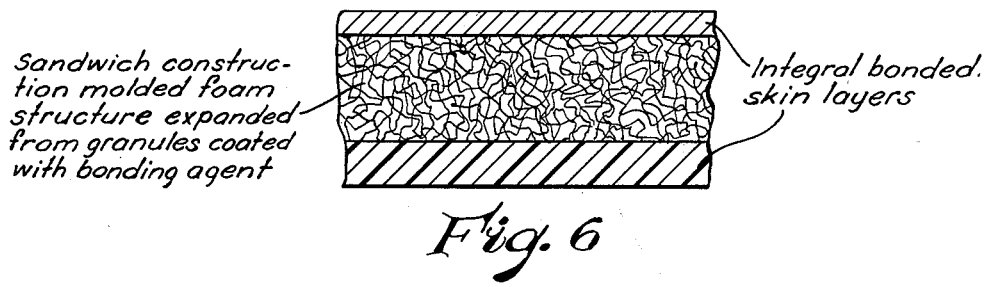
INVENTOR.
William J. McMillan
BY
Griswold & Burdick
ATTORNEYS 3,154,604
METHOD FOR FORMING ARTICLES COMPRISING EXPANDED THERMOPLASTIC RESINOUS MATERIALS
William J. McMillan, Midland, Mich., assignor to The Dow Chemical Company, Midland, Mich., a corporation of Delaware
Filed Mar. 19, 1956, Ser. No. 572,305
19 Claims. (Cl. 264—45)

This invention relates to an improved method for forming various articles and structures with expandable or "foamable" thermoplastic resinous materials and to the expandable masses which advantageously may be used in the method and the articles which advantageously may be obtained by practice of the method.

Pursuant to the known art, a variety of thermoplastic polymeric and resinous materials may be expanded from a granular or bead form to assume a porous, multi-cellular, solidified foam-like structure by the action of various propellants or agents for expanding or blowing the materials to a "foam." The blowing agents, in accordance with common practice, are usually gases (or gas generating substances) or highly fugacious liquids which have been dissolved or otherwise intimately incorporated within the thermoplastic resinous material while it is in an unexpanded granular form. The application of heat to an unfoamed or incompletely foamed granular thermoplastic resinous material containing a blowing agent causes the blowing agent to be released or thermally expanded, or both, while the thermoplastic material is attaining a foaming temperature at which it is sufficiently softened and yieldable to permit the pressure of the thermally expanding blowing agent to expand and form it into the desired foam structure. The heat energy which is required to soften the thermoplastic resinous material and release or thermally expand the blowing agent for the foam forming function may conveniently be derived from an externally generated source. Thus, steam, hot air, heated baths, radiant heat and other heat supplying or providing means may be employed for the purpose of foaming the expandable thermoplastic resinous material.

Many expandable thermoplastic resinous materials have the potential for being expanded to a foamed volume which may occupy as much as 30 to 40 times and more their original volume in an unfoamed and completely unexpanded condition. If a granular mass of a given quantity of expandable thermoplastic resinous material is foamed or expanded within a confining space, such as a mold form, having a capacity which is less than the volume which may be anticipated from the expansion potential of the mass being foamed, the expanding mass is caused to be distorted to and to assume the configuration of the confining space and to be fused into an integral, molded foam structure.

Difficulty, however, is frequently encountered in satisfactorily forming expandable thermoplastic resinous materials into both freely expanded and molded articles and structures. Granular materials are often awkward and inconvenient to handle and may not be readily amenable to being properly distributed during formation. This is especially true when they are charged to a confining space, such as a mold form, wherein it may be hard to obtain molded foam structures which are well shaped to the outlines of the mold. Similar problems exist when expandable granular materials are attempted to be formed to any other desired configuration. Also, completely unexpanded granules of expandable thermoplastic materials are not particularly adapted for employment in various types of perforated mold forms and the like which might facilitate their being more efficiently heated during a foam molding operation by permitting more intimate and rapid contact with a heat-supplying means, such as steam.

In addition, granular masses of expandable thermoplastic resinous materials are not especially suited for fabrication, especially in a continuous manner, into expanded foam structures in the form of sheets or planks, and the like. Furthermore, it is generally not feasible with the conventionally employed expandable masses of a given thermoplastic resinous material to obtain articles and structures having appreciable variations in their physical properties and characteristics due to the inherent limitations imposed by the employment of a given material. Neither is it ordinarily feasible to obtain certain types of composite articles and structures such as laminates and sandwich type constructions having a core or integral section of a foam structure without the performance of additional processing steps in order to glue or bond an expanded mass to or between skins or external layers of other desired materials.

Even the utilization of pre-expanded granules of thermoplastic resinous materials does not preclude or eliminate all difficulty in obtaining suitable foam articles and structures. Such granules are those which have been incompletely foamed or expanded prior to their final formation to a foam structure as in a molding operation. Frequently, pre-expanded granules may have been partially foamed to as much as 60–70 percent and more of their expansion potential before being molded. They tend to provide a better and more uniform distribution of material in molded foam structures by occupying greater relative proportions of a mold confining space in comparison to that which is occupied by expandable materials which are completely unfoamed or in a less expanded condition. Such pre-expanded granules, however, are not any better adapted than are completely unexpanded granules for fabrication into many types of expanded foam structures such as sheets or planks nor do they more readily provide products whose properties and characteristics are relatively unlimited by the thermoplastic resinous material of which they are comprised or which may be directly formed more easily into composite structures and laminates with other materials.

Therefore, it is among the principal objects of the present invention to provide an improved method for forming expandable thermoplastic resinous materials into various articles and structures.

It is a related object to provide a method wherein expandable masses of thermoplastic resinous materials in granular or bead form can be more readily and conveniently handled during their formation into various articles and structures.

A further object is to provide a facile method whereby the physical properties and characteristics of the articles and structures obtained from expandable masses of thermoplastic resinous materials are not necessarily limited by the choice of a given thermoplastic resinous material.

A still further object is to provide a method wherein certain shapes and structures, particularly sheets and planks, can be easily obtained from expandable masses of thermoplastic resinous materials in granular form, especially in a continuous manner of operation.

Another object is to provide a method wherein expandable masses of thermoplastic resinous materials can be directly formed into various composite articles and structures having a laminated or composite sandwich construction wherein a core or section of the expanded thermoplastic material is integrally attached to or between skins or exterior layers of other desired materials.

Yet another object is to provide expandable masses of thermoplastic resinous materials which advantageously can be employed in the practice of the invention.

It is an additional object of the present invention to provide superior formed articles and structures, including composite articles and structures, which have been prepared within the expandable masses and in accordance with the method of the present invention.

Other objects and advantages of the invention will be more apparent in the following description and specification.

According to the invention, a thermoplastic resinous material in discrete granular form in which there is incorporated a blowing agent and which is adapted to be expanded by application of adequate heat to the mass to attain a foaming temperature within the mass to sufficiently soften the mass and cause expansion of the blowing agent in the discrete particles therein may advantageously be formed into a foam structure by coating the discrete particles of expandable thermoplastic resinous material with a non-volatile polymeric bonding agent that is adapted to flow at a temperature which is beneath the foaming temperature of the expandable mass; preforming the mass of coated discrete particles of expandable thermoplastic resinous material into a coherent, further expandable form at a temperature in the range from the flow temperature of the polymeric bonding agent to the foaming temperature of the expandable mass; and subsequently heating the preformed mass of expandable thermoplastic resinous material to a foaming temperature to expand it to a foam structure.

The discrete particles of expandable thermoplastic resinous material may be coated with the polymeric bonding agent in any desired manner in order to form the expandable masses of the invention. Thus the bonding agent may be applied to the surface of the discrete particles from or as a liquid solution, dispersion, suspension or in other composition with suitable vehicles by mixing, dipping, spraying or according to other granule coating techniques. In such cases it is advantageous to dry the coated granules before preforming them in order to remove any vehicle or other extraneous volatile material that may have been employed in the applying composition for the bonding agent. If preferred, the discrete particles may be coated with the bonding agent by conventional dry mixing or blending techniques.

The preforming of the coated discrete particles of expandable thermoplastic resinous material to obtain the preformed articles may frequently be best performed with the application of pressure for purposes of forming the more readily handleable coherent mass within the indicated temperature range. Thus, compression molding techniques may frequently be advantageously utilized for the preforming. In many cases, however, sheets and other forms of preformed unexpanded material such as tubes and rods can be satisfactorily obtained by extrusion or calendering and other roll forming techniques. Both the coated granules of the coherent preforms may, if desired, be stored for convenient periods of time until their subsequent use.

The expanded articles prepared according to the present invention may either be completely or partly unconfined foam structures or molded foam structures. For some purposes it may be beneficial for them to be molded foam structures whose ultimate shaped configurations have been anticipated or preconformed to by the shape which is conferred upon the preformed mass. In many instances the final molding of the foam structure may advantageously be accomplished after expansion of the preformed mass by subjecting the expanded mass, while it is still in a pliable, thermoplastic condition, to the hot working influence of a mold form or other shaping or pressure forming means such as platens or rolls and the like. In other instances they may be composite molded foam structures in which the foam confining mold form is laminated to the expanded foam structure and is retained in an integral association or coalescence therewith by the adhesive effect provided from the expanded thermoplastic resinous material or the polymeric bonding agent, or both, so as to obtain strong laminates or sandwich panel constructions of various desired configurations.

In FIGURE 1 of the accompanying drawing there is figuratively represented, in the manner of a self-explanatory flow diagram, the various major processing and operational steps which may be undertaken in the practice of the method of the invention. FIGURE 2, in greatly magnified cross-section, schematically represents a coated expandable granule in accordance with the invention. FIGURE 3 perspectively illustrates a coherent, preformed mass of the expandable granules of thermoplastic resinous material held together by the polymeric bonding agent. FIGURE 4 is a schematic representation, in cross-sectional perspective, of a molded article in accordance with the invention, and FIGURES 5 and 6, in fragmentary cross-section, schematically illustrate composite structures having, respectively, a single laminated layer and double laminated layers to provide a complete sandwich construction.

Any thermoplastic resinous material which can be expanded or foamed by conventional techniques may advantageously be formed into articles in the practice of the invention. Merely for purposes of convenient illustration, however, without intending to be restricted thereto, the invention will be predominantly described in connection with expandable granules of polystyrene, which may be in an essentially linear or in a cross-linked form, as being generally representative of expandable thermoplastic resinous materials and as being especially representative of alkenyl aromatic compounds which contain at least about 50 percent by weight of at least one alkenyl aromatic compound having the general formula Ar—CR=CH$_2$ wherein Ar is an aromatic radical and R is selected from the group consisting of a hydrogen atom and a methyl radical. Expandable thermoplastic copolymers of styrene and polymers and copolymers of α-methyl styrene, ar-methyl styrene or vinyltoluene, mono- and di-chlorostyrene and ar-dimethyl styrene, including copolymers with such materials as vinylidene chloride and cross-linked copolymers containing small amounts of such materials as divinylbenzene may frequently be utilized with benefits commensurate with these which are derivable from employment of polystyrene. Often this may also be the case with other expandable thermoplastic resinous materials including those which may be comprised of polymers and copolymers of methyl methacrylate, ethyl acrylate and the like, such as their homopolymers and copolymers of methyl methacrylate and vinylidene chloride; polymers and copolymers of vinyl acetate and vinyl butyral and the like; and various thermoplastic or thermoplastified derivatives of cellulose including cellulose nitrate and cellulose acetate. If desired, partially foamed or pre-expanded materials may be utilized provided they retain some potential or capability for further expansion upon attainment of a foaming temperature.

The blowing agents employed for the expandable thermoplastic resinous material may be those which are commonly utilized including dichlorodifluoromethane, carbon dioxide and pentane or other low boiling hydrocarbons and other suitable materials such as heat sensitive gas generating agents and the like. Conventional amounts of the various blowing agents may be incorporated in the discrete particles of expandable thermoplastic material. Thus, by way of illustration, suitable and efficient expandable polystyrene granules may contain between about 5 and 15 percent by weight of incorporated dichlorodifluoromethane or between about 2 and 12 percent by weight of incorporated carbon dioxide as a blowing agent. The optimum quantity of blowing agent to be utilized in particular situations depends, of course, upon the specific blowing agent that is involved as well as upon the thermoplastic resinous material being foamed and the degree of expansion or density desired in the foamed article.

Any of a variety of non-volatile, thermoplastic, polymeric materials may be employed suitably as the bonding agent. Usually it is advantageous to utilize relatively low molecular weight forms of the polymeric materials in order that they may be adapted to flow at a temperature which is beneath the foaming temperature of the expandable mass. Most expandable polystyrene and like materials, for example, require a temperature of at least about 85–90° C. for this purpose although expandable granules of certain cross-linked forms of such materials and expandable granules of such materials as polydichlorostyrene may require temperatures in the neighborhood of 150° C. and higher in order to be foamed. Preferably, the polymeric bonding agent, if it boils at all, should have a low boiling point in excess of at least about 140° C. It should be substantially inert to the expandable thermoplastic resinous material which is coated. In other words, the polymeric bonding agent should not enter into a chemical reaction with the resinous material so as to cause its degradation or decomposition or to otherwise alter its essential characteristics. Neither should it be physically reactive within the thermoplastic resinous material as by dissolving it or causing it to be excessively swollen. A slight softening or plastifying influence, however, may, under certain circumstances, have a benign effect to increase the volume of expanded material which may be attained by a given mass of thermoplastic resinous material.

It is particularly beneficial for the polymeric bonding agent to be a film-forming material having a pronounced adhesive effect upon the expanded thermoplastic resinous material, especially when molded articles or sandwich type constructions retaining the mold form are being prepared. This serves to reinforce the entire foam structure and produces an article of unusual sturdiness and high strength. Polymeric bonding agents having high adhesive properties provide an unusually tough skin or outer layer of incompletely foamed granules of the expandable thermoplastic resinous material when it is foamed to a molded structure.

Bonding agents of this nature are particularly beneficial when a composite sandwich construction retaining the mold form as a laminate is involved. In such case, the adhesive agent bonds and tightly laminates the molded foam to the integral mold form. The quantity of the polymeric bonding agent which is employed depends not only upon its coating or film-forming characteristics but upon the particular size of the discrete particles to which the bonding agent is applied and the properties desired in the finally formed product. In many instances, either a greater flexibility or stiffness, depending upon the particular nature of the bonding agent, may be imparted to the foamed mass by using greater amounts of the bonding agent than might be required merely for satisfactory coherence of the unfoamed mass in order to permit the characteristics of the bonding agent to become appreciable or more pronounced in the final product.

Although the requirements may vary in particular instances, it is usually beneficial to coat the granules with between about 0.5 and 20 percent by weight of the bonding agent, based on the weight of the granules. The optimum relative quantities of the bonding agent within the indicated range generally vary with the particular type of preforming operation that may be contemplated for the expandable material. Thus, when the preforming is to be accomplished by compression molding techniques, it is usually advantageous to coat the granules with between about 0.5 and 15 and, more advantageously between about 0.5 and 7.5 percent by weight of the bonding agent, based on the weight of the granules. For preforming by extrusion, between about 3 and 20 and, more advantageously, between about 3 and 12 percent by weight of the bonding agent can be employed. Likewise, for calendering, an amount of the bonding agent between 3 and 20, and beneficially, between 3 and 15 percent may be advantageous. In certain instances, some bonding agents may be employed in quantities which are less than or in excess of the indicated range, due to their individual properties as coating and adhesive bonding materials or to other factors that may become involved.

The polymeric bonding agent may, as indicated, be employed as a resin solution, emulsion or dispersion in a liquid which may or may not have a solvent effect upon the expandable thermoplastic resinous material. Alternatively, it may be a film-forming latex which may contain minor proportions of a solvent liquid for the expandable material or it may be formulated as a plastisol or be used as a dry resin which is dry blended with the foamable granules.

If a solvent liquid for the expandable thermoplastic resinous material is employed, it should not be capable of attacking the unexpanded granules to the extent that excessive quantities of the incorporated blowing agent are released. This may significantly and detrimentally alter the foaming characteristics of the unexpanded material. When solvent or dispersing liquids are employed to assist in the coating application of the polymeric bonding agent, especially if they have a solvent action on the unexpanded thermoplastic resinous material, the coated mass should be efficiently mixed and agitated until it is dried so as to prevent interference with its free-flowing granular characteristics as coated particles before their preforming.

If the polymeric bonding agent is employed as a dry resin and is coated on the expandable granules of thermoplastic resinous material by dry mixing or blending, it is usually advantageous to employ a mixing temperature in excess of the flowing temperature of the bonding agent to effect the coating and to continue the mixing of the coated mass until it is cooled to a temperature beneath the flowing temperature of the bonding agent in order to preclude the formation of sticking or cohering coated particles. Banbury mixers and similar apparatus equipped with means for heating and cooling may frequently be advantageously utilized for dry mixing purposes. A more thorough and intimate mixture and coating of the bonding agent on the expandable granules generally secures better results in the practice of the invention.

A low molecular weight polystyrene in the molecular weight range from about 10,000 to 40,000 is a particularly advantageous bonding agent for a great variety of applications as are film forming latexes of copolymers of styrene and butadiene that contain from about 30 to 95 and, more advantageously, from about 50 to 70 percent weight of butadiene polymerized in the copolymer molecule. Such materials, including the polymer from the latex, have excellent adhesive properties as bonding agents for expandable thermoplastic resinous materials in granular form and, having flowing temperatures which ordinarily are between about 60° C. and 115° C., adapt themselves nicely to the preformation of the expandable material. In addition, the employment of greater quantities of such bonding agents, particularly the sytrene-butadiene copolymer, may provide desirable degrees of flexibility for certain purposes in the formed foam product.

The polystyrene bonding agent may be dry mixed conveniently with most expandable thermoplastic resinous materials or it may be applied from solution or dispersion. For dry mixing purposes, it is usually desirable to blend an amount of the polystyrene which is less than about 10 percent by weight of the granules. Frequently, an amount between about 0.5 and 5.0 percent by weight may frequently be more suitable for dry mixing. Such solvent vehicles as acetone, carbon tetrachloride, monomeric styrene, or vinyl toluene and the like may be employed. Advantageously, the solutions may contain from about 2 to 30 and, more advantageously, from 5 to 15 percent by weight of solids. Any pourable liquid dispersion or uniform slurry of the bonding agent may also be utilized.

Other materials which may also be advantageously employed as bonding agents include copolymers of acrylonitrile and butadiene containing at least about 55 and, more advantageously from about 65 to 85 percent by weight of butadiene copolymerized in the polymer molecule; copolymers of ethylene acetate and methyl methacrylate; low molecular weight haloethylene polymer resins including polyvinylchloride in plastisol formulations which, by way of illustration, may be comprised of between about 30 and 70 percent by weight and, more advantageously, between about 40 and 60 percent by weight of a suitable plasticizer such as dioctylphthalate; and the like. In many cases it may also be suitable to utilize relatively low molecular weight polymers of such materials as dichlorostyrene, vinyl toluene, isobutylene, methyl acrylate, methyl methacrylate, acrylonitrile and the like as bonding agents.

As mentioned, the coated granules of expandable thermoplastic resinous material may be preformed in any desired manner to a shape which anticipates the desired form of the final expanded foam article or product. Thus, compression molding techniques may be suitable for many purposes although, in other instances, molding with vacuum assistance according to vcauum forming techniques may be desirable to achieve certain irregular-contoured preforms. Adequate pressures should be employed, depending on the adhesiveness of the bonding agent and the temperature which is being employed to compact the coated granules to a coherent mass.

While the preforming operation must be conducted at a temperature between the flowing temperature of the bonding agent and the foaming temeprature of the expandable thermoplastic resinous material, it may be advantageous in certain instances to preform at about the foaming temperature of the expandable material. In this way there may simultaneously be obtained a coherent preform and a pre-expanded mass of expandable thermoplastic resinous material. Any desired degree of pre-expansion may be effected during the preforming, provided that there remains an appreciable expansion potential in the expandable mass. It is usually desirable to limit such pre-expansion in the preforming operation to less than about 60–70 percent by volume of the total expansion potential from a completely unexpanded condition of the expandable mass of thermoplastic resinous material.

Sufficient heat should be employed for expanding the preformed mass of expandable thermoplastic resinous material to result in its attaining an adequate foaming temperature to cause it to be volumetrically expanded at least about 3 times its initial volume to foam structures which have densities that are in correspondence with their expanded volumes. Preferably the heat applied is sufficient to cause a given material to expand to a foam structure having a density of at least about 2 pounds per cubic foot. Lighter structures are usually obtainable with the employment of higher foaming temperatures. Frequently, a less dense product may even be more desirable for many applications than heavier structures.

Any suitable and convenient source of heat may be employed to meet the requirements of particular situations for expanding preformed granules of expandable thermoplastic resinous material to a foam structure. Thus conductive heat as from heated platens may be used in many instances. At other times, steam, hot air or other gases, heated baths, radiant heat energy, heat from infra-red sources and dielectric or other forms of high frequency heating may be employed for the purpose.

Further illustration of the invention is provided in and by the following examples wherein, unless otherwise indicated, all parts and percentages are to be taken by weight.

*Example I*

About 100 grams of a latex comprising about 48 percent of an emulsified copolymer of styrene and butadiene which contained about 60 percent by weight of styrene polymerized in the copolymer molecule was mixed with about 2 grams of vinyltoluene. About 5 grams of this mixture was employed to coat about 50 grams of expandable polystyrene granules by wet mixing. The expandable polystyrene granules had a mean particle size of about 2 millimeters and had about 8 percent of dichlorodifluoromethane incorporated as a blowing agent. The wet granules were dried, then preformed into a coherent mass having dimension of about ⅛″ x 1¾″ x 2½″ by compression molding them for about 3 minutes at about 95° C. under a pressure of about 2,280 pounds per square inch. The preform was expanded without confinement by placing it loosely between steam heated platens for a period of about 3 minutes at a temperature of about 180° C. The foamed product had a density of about 5 pounds per cubic foot. It had an attractive appearance and was formed with excellent uniformity and strong physical characteristics.

*Example II*

About 50 grams of the same expandable granules that were employed in Example I were coated with a polystyrene bonding agent which was applied with efficient mixing from a solution composed of about 4.4 parts of the relatively low molecular weight polystyrene in about 60 parts of acetone and 35.6 parts of diethyl ether. About 13 grams of the solution was employed for the coating, after which the coated granules were dried and shaped into a ⅛″ x 1¾″ x 2½″ preform by compression molding them for 3 minutes under a pressure of about 1,140 pounds per square inch at a temperature of about 95° C. A clear, rigid preform was obtained which was subsequently expanded at a temperature of about 150° C. for 3 minutes to a uniform foam structure having a density of about 6 pounds per cubic foot.

*Example III*

About 0.21 pound of the same expandable granules as were employed in the foregoing examples were mixed with about 0.035 pound of the same latex as employed in Example I without the inclusion of vinyltoluene. The wet mixture was spread into a uniform six inch square sheet and permitted to dry before being compression molded to a sheet having the same area under a pressure of about 140 pounds per square inch at a temperature of 100° C. for about 3 minutes. The preform was placed in a 1″ x 6″ x 6″ mold form and expanded into a molded foam structure by heated platens which were maintained at about 190° C. for 2 minutes and then at about 150° C. for 12 minutes. The molded foam structure was cooled and found to have a uniform density of about 10 pounds per cubic foot with an extremely tough surface skin on the molded article.

*Example IV*

A dry blended mixture, weighing about 0.21 pound, of about 9 parts of the same expandable granules employed in the foregoing examples and about 1 part of the low molecular weight polystyrene bonding agent employed in Example II was compression molded at 90° C. under about 280 pounds per square inch pressure for 3 minutes into the same type of preform obtained in Example III. A clear rigid sheet resulted. Using a foaming temperature of about 150° C. for about 15 minutes, the sheet was foam molded in the same mold form that was employed in Example III. An excellent molded structure was obtained having about the same density as that prepared in Example III.

Example V

A haloethylene polymer resin adhesive comprised essentially of an adhesive vinyl polymer was mixed in the amount of about 3.5 grams with about 50 grams of the same expandable granules employed in the foregoing examples. After drying, the granules were compression molded to preforms and subsequently expanded to excellent foam structures in a manner similar to that set forth in the preceding examples.

Example VI

About 40 grams of a plastisol consisting of about 120 parts of polyvinylchloride, 140 parts of dioctylphthalate and 1 part of aluminum stearate was mixed with about 880 grams of the same expandable granules employed in the preceding examples and dried. A 9/16" x 6" x 6" preform was prepared with the plastisol coated granules by compression molding for 15 minutes at 90° C. under a pressure of about 833 pounds per square inch. The preform was freely expanded to a foam structure having a volume about 4½ times its original volume by heating it between the electrodes of a dielectric heating apparatus which aws operated at a frequency of about 27 megacycles with an impressed voltage of about 2,000 volts.

In a similar manner a slightly pre-expanded preform was obtained with the same plastisol coated granules by compression molding them under a pressure of about 70 pounds per square inch at a temperature of 120° C. for 10 minutes. The pre-expanded preform, having a dimension of about 5/8" x 6" x 6", could subsequently be expanded by dielectric heating or in any other desired manner.

Example VII

Expandable granules of a thermoplastic resinous material comprising polystyrene which had been cross-linked with about 0.02 percent of divinylbenezene having an average particle diameter of about 4 millimeters and containing about 7 percent of dichlorodifluoromethane as a blowing agent were mixed with the same latex as employed in Example I in the ratio of about 52.2:27.8, respectively. After being dried, about 68 grams of the coated particles were compression molded into a 1/8" x 6" x 6" preform under a pressure of about 380 pounds per square inch at a temperature of about 95° C. for 3 minutes. The preform was foamed into a block having a density of about 16 pounds per cubic foot according to the dielectric heating technique employed in Example VI.

Example VIII

About 54 parts of the same expandable granules employed in Example I were wet with about 7 parts of a solution of 8 parts of the low molecular weight polystyrene bonding agent employed in Example II, 695 parts of acetone and 96 parts of carbon tetrachloride. The coated granules were dried with agitation to prevent their sticking together. About 5.4 pounds of the coated granules were compression molded into a 1" x 12" x 18" board at a temperature of about 100° C. under a pressure of about 615 pounds per square inch for a period of about 20 minutes. The preform was freely expanded to a foam structure having dimensions of about 2" x 26½" x 4" by heating it in a water bath at a temperature of about 95° C. for about a 40 minute period.

As has been indicated, various molded articles and structures may advantageously be obtained as products in accordance with the present invention. For example, freely expanded preforms may be prepared in the form of blankets or sheets which may be stamped or cut to desired shapes after cooling. Or, if desired, a freely expanded preform may be hot worked to a desired shape or configuration by means of pressure rolls or with such shaping means as dies, platens, upsetting and pressing equipment and the like, or by means of templates and similar paparatus. Various articles may be inserted within or partially within the freely expanded structure before it is cooled in order to form reinforced or specialized types of composite structures. In certain instances, composite structures may be prepared with a freely expanded preform by laminating a desired outer layer or layers to the foam structure before it has cooled. Such a technique may be advantageous when, for various means, it may not be desirable or convenient to expand the preform in place in a composite structure.

Many types of molded structures may be prepared by practice of the invention including, especially, molded articles that may have irregular contours or complex shapes, or both, particularly when vacuum formed preforms are utilized. The composite structures, sections or cores may be laminated to and between various types of cloth and fabric, glass, concrete, plastic film and sheet materials, wood, metal, and the like. Restraining molds may also be employed in the preparation of composite structures if it is not suitable for the integral, laminated layer to function as the sole mold form for the expanding mass of thermoplastic resinous material in the preform.

The completely expanded articles which may be obtained in the practice of the invention may be employed as materials of construction or for decorative purposes in the form of sheets, planks, boards, blocks, rods, and the like which have good insulating, vapor barrier and buoyancy characteristics. Foam structures prepared to have relatively greater densities may, in many cases, comprise desirable substitutes for wood or metal for various purposes. Sandwich construction materials, in particular, may be advantageously employed as insulation for low temperature applications such as in or around pipe, conduits and ducts or as insulating tile. They may also find wide application in the refrigeration field for doors, baffles, separators, food liners, freezer chests and for such uses as in food dispensing machines and the like.

Sandwich construction articles may be employed beneficially, for example, in the automotive and allied fields to constitute various parts and elements or to eliminate metal bracing and reinforcement in doors, panels and the like or to permit the employment of relatively thinner sheets of metal to form laminated parts having equivalent or greater sturdiness and strength than would the same parts when formed with thicker metal sections and reinforced by conventional bracing techniques. The present invention may also be practiced to fill the tips of airplane wings, for example, and other aircraft parts in order to secure greater strength in them and in the manufacture of such items as skis and various protective articles of clothing such as sunhats and safety headgear for both recreational and industrial purposes.

Many advantageous uses are possible for the rigid, high-strength foam reinforced articles which may be obtained in the practice of the invention by preparing laminates and laminated sandwich constructions with metal, wood, glass and glass cloth, fabric, leather, concrete, films and sheets of plastic material and the like. Machine cases, luggage, furniture, mannikins and advertising display items may readily be provided by the invention. Certain sandwich constructions may also be utilized advantageously for their buoyant characteristic in boats or to comprise buoys, pontoons, docks, bulkhead fillers and the like. Many other applications and uses for the present invention exist which are of equivalent significance and importance to the few which have been mentioned.

Certain changes and modifications in the practice of the present invention can be readily entered into without departing substantially from its intended spirit and scope. Therefore, it is to be fully understood that the invention is not to be considered as being limited or in any way restricted by or to the preferred didactic embodiments thereof which are set forth in the foregoing description and specification. Rather, it is to be interpreted and construed in the light of what is set forth and defined in the hereto appended claims.

What is claimed is:

1. Method for forming into a foamed structure a thermoplastic resinous material in discrete granular form in which there is incorporated a blowing agent and which is adapted to be expanded by application of adequate heat to the mass to attain a foaming temperature within the mass to sufficiently soften the mass and cause expansion of the blowing agent in the discrete particles therein which comprises coating the discrete particles of expandable thermoplastic resinous material with a minor proportion of between about 0.05 and 20 weight percent, based on the weight of said particles, of a low molecular weight, non-volatile, thermoplastic polymeric bonding agent that is adapted to flow at a temperature which is beneath the foaming temperature of the expandable mass, said bonding agent having an adhesive effect upon the thermoplastic resinous material when it is in an expanded condition; mechanically preforming the mass of coated discrete particles of expandable thermoplastic resinous material into a coherent further expandable form having a depth in excess of the diameter of the largest particle employed at a temperature in the range from the flow temperature of the polymeric bonding agent to the foaming temperature of the expandable mass; and subsequently heating the preformed mass of expandable thermoplastic resinous material to a foaming temperature to expand it to a foam structure.

2. The method of claim 1 wherein the discrete particles of expandable thermoplastic resinous material are coated by application of the polymeric bonding material dispersed in a liquid vehicle and including the step of drying the coated particles.

3. The method of claim 1 wherein the discrete particles of expandable thermoplastic resinous material are coated by dry-blending them with the polymeric bonding agent.

4. The method of claim 1 wherein the coated discrete particles of expendable thermoplastic resinous material are preformed by compression molding.

5. The method of claim 1 wherein the coated discrete particles of expandable thermoplastic resinous material are preformed by extrusion techniques.

6. The method of claim 1 wherein the coated discrete particles of expandable thermoplastic resinous material are preformed by calendering techniques.

7. The method of claim 1 wherein the coated discrete particles of expandable thermoplastic resinous material are preformed at a foaming temperature to cause them to be in a pre-expanded, coherent, further expandable form.

8. The method of claim 1 wherein the preformed mass of expandable thermoplastic resinous material is heated to a foaming temperature to expand it to a foam structure while it is in an unconfined and freely expandable condition.

9. The method of claim 1 wherein the preformed mass of expandable thermoplastic resinous material is heated to a foaming temperature to expand it to a foam structure while it is in an unconfined and freely expandable condition and including the step of hot working the foam structure before it has cooled from a thermoplastic condition.

10. The method of claim 1 wherein the preformed mass of expandable thermoplastic resinous material is heated to a foaming temperature to expand it to a foam structure while it is in an unconfined and freely expandable condition and including the step of inserting articles within the foam structure to form a composite foam structure before it has cooled from a thermoplastic condition.

11. The method of claim 1 wherein the preformed mass of expandable thermoplastic resinous material is heated to a foaming temperature to expand it to a foam structure while it is in an unconfined and freely expandable condition and including the step of laminating a layer of another material to the surface of the foam structure to form a composite sandwich construction article before the foam structure has cooled from a thermoplastic condition.

12. The method of claim 1 wherein the preformed mass of expandable thermoplastic resinous material is heated to a foaming temperature while it is in a confining space in a mold form to expand it to a molded foam structure.

13. The method of claim 1 wherein the preformed mass of expandable thermoplastic resinous material is heated to a foaming temperature while it is in a confining space in a mold form to expand it to a molded foam structure wherein said mold form is bonded to and retained by said foam structure in an integral, laminated sandwich construction.

14. The method of claim 1 wherein the expandable thermoplastic resinous material comprises a polymerized alkenyl aromatic resinous material which contains in its composition at least about 50 percent by weight of at least one alkenyl aromatic compound having the general formula $Ar-CR=CH_2$ wherein Ar is an aromatic radical and R is selected from the group consisting of a hydrogen atom and a methyl radical.

15. The method of claim 1 wherein the expandable thermoplastic resinous material comprises polystyrene.

16. The method of claim 1 wherein the expandable thermoplastic resinous material comprises polyvinyltoluene.

17. The method of claim 1 wherein the polymeric bonding agent has a boiling point in excess of at least about 140° C.

18. The method of claim 1 wherein the polymeric bonding agent is a polystyrene having a molecular weight between about 10,000 and 40,000.

19. The method of claim 1 wherein the polymeric bonding agent is a copolymer of styrene and butadiene containing between about 30 and 95 percent by weight of butadiene polymerized in the polymer molecule.

References Cited in the file of this patent

UNITED STATES PATENTS

| | | |
|---|---|---|
| 2,525,966 | Smith et al. | Oct. 17, 1950 |
| 2,681,321 | Stastny et al. | June 15, 1954 |
| 2,744,291 | Stastny et al. | May 8, 1956 |
| 2,787,809 | Stastny | Apr. 9, 1957 |
| 2,862,834 | Hiler | Dec. 2, 1958 |
| 2,865,800 | Stastny | Dec. 23, 1958 |
| 2,894,918 | Killoran et al. | July 14, 1959 |
| 2,979,775 | White | Apr. 18, 1961 |